United States Patent [19]

Noll

[11] 4,167,917
[45] Sep. 18, 1979

[54] BIRD SHELTER AND FEEDER

[76] Inventor: Frank P. Noll, 36 Chews Landing Rd., Lindenwold, N.J. 08021

[21] Appl. No.: 846,673

[22] Filed: Oct. 31, 1977

[51] Int. Cl.$^2$ ............................................. A01K 31/00
[52] U.S. Cl. .................................. 119/23; 119/51 R; 119/63
[58] Field of Search ..................... 119/23, 51 R, 52 R, 119/59, 63

[56] References Cited

U.S. PATENT DOCUMENTS

| | | | |
|---|---|---|---|
| 1,166,100 | 12/1915 | White | 119/23 |
| 2,219,297 | 10/1940 | Copeman | 119/23 |
| 2,312,551 | 3/1943 | Hoskins | 119/23 |
| 3,191,579 | 6/1965 | Oliver | 119/51 R |
| 3,195,507 | 7/1965 | Miller | 119/23 |
| 3,250,249 | 5/1966 | Nelson et al. | 119/23 |

Primary Examiner—Jay N. Eskovitz
Attorney, Agent, or Firm—Thomas A. Lennox

[57] ABSTRACT

A combination bird house and bird feeder is provided which includes a pitched top, two side walls and a back securely attached together, the bottom floor being detachable and extending toward the front to form a feeding platform with shoulders to prevent loss of the feed, the front wall being two detachable wall sections, the top having various size apertures, selection of which is provided, and the bottom section having a perch and a cover extending over the feeding platform, the front wall resting on the bottom floor and being detachable only if the bottom floor is first removed.

15 Claims, 5 Drawing Figures

BIRD SHELTER AND FEEDER

BACKGROUND OF THE INVENTION

This invention relates to bird houses and bird feeders and provides a combination of both.

Many persons love song birds and would like to attract them to their place of dwelling. It is recognized that it is best to design the bird house of sufficient size and opening for a particular species of bird. However, it is most discouraging to purchase a house for a particular type of bird and then find that none appear leaving the house useless. A bird house with a small portal permanently enlarged with difficulty but if it is found to be too large to prevent invasion by less desirable birds, correction is almost impossible.

If the homeowner is able to attract birds to a house on his property, it has been found that birds will generally reside there year round as long as sufficient and proper food is provided. However, a nearby feeding station may draw the larger and bullying type birds, discouraging the smaller birds in the house and causing them to leave them for a warmer climate. A daily supply of food for the smaller birds living in the house would be effective if only the larger birds could be prevented from taking the food first.

For many of the smaller birds, the interior dimensions of a bird house fall into a single useful range. However, the portal dimensions are critical as to the choice of the birds. While smaller birds will sometime nest in houses with large portals, they prefer a portal that will prevent the entry of predatory birds, bossy birds and animals such as squirrels, rats and the like.

It is recommended that bird houses be completely cleaned out after nesting is completed after the nestlings leave after cleaning out the family of birds will remain in the house building a new nest over the summer months and will remain through the winter season till the spring time.

It is an object of this invention to provide a bird house and feeding station that is durable, rainproof and readily accessible for cleaning.

It is a further object of this invention to provide a combination bird house and feeding station which allows the owner to change the size of the bird house portal and control the likelihood of a chosen species of bird that will inhabit the house.

It is an additional object of this invention to provide a bird feeder in conjunction with the bird house which will provide sufficient food for the family of birds therein, but will prevent larger birds from feeding at the station.

It is a specific object of this invention to provide a bird house and feeding station combination that can easily be disassembled to clean out the house and feeding station and change the size of the portal if desired.

It is a further object of this invention to provide a bird house that provides protection from predatory birds from above and provides protection for the food placed in the feeding station of the device.

DESCRIPTION OF PRIOR ART

Excellent books and brochures have been printed on the size, shape and construction of bird houses including those by the U.S. Government Printing Office. Of these Conservation Bulletin 14, *Homes for Birds*, revised 1969, by the U.S. Department of the Interior, Fish and Wildlife Service, Stock No. 2400-0050, recommends various criteria for bird house construction. The National Audubon Society, 950 Third Ave., New York City, 10022 has printed Circular No. 29, *Bird Houses and Feeders*, by Peterson which gives construction details for houses and feeders.

In U.S. Pat. No. 3,195,507, D. K. Miller describes a suspension knock-down shelter for birds using inter-fitting slots. T. E. Brown, in U.S. Pat. No. 3,295,498, discloses a convertible bird house or bird feeder, wherein it is possible to modify the structure to do either function.

A number of U.S. patents have described bird houses of various configurations. U.S. Pat. No. 3,053,226 to G. M. Dunn, describes a bird house of multi-rooms with doubled end covers to provide ventilation. In U.S. Pat. No. 3,182,634, G. B. Myaida, et al. disclose a bird house with an obstructed entrance foyer to prevent intrusion of undesirable animals.

None of these patents or materials describe the invention hereinafter claimed or satisfy the above objects.

SUMMARY OF THE INVENTION

A combination bird shelter and feeder is provided including an enclosure securely attached together of a pitched top, two upright side walls and a back upright wall. The detachable bottom floor is of a size, which when attached to the walls, proximate to the bottom edge of the walls, extends horizontally past the front edge of the side walls to form a feeding platform. A shoulder system is provided on the feeding platform extension to prevent the feed from falling off the edges. The bottom floor is preferably attached by providing a pair of adjacent horizontal grooves on the inner faces of the side walls in which projections from the edges of the bottom floor is slidably inserted to form the floor of the shelter and the feeding platform.

A detachable front wall system preferably includes two separate wall sections, the top front wall section having there through at least one portal, the size chosen to allow a predetermined size of bird to enter the shelter. A cover system is attached to the front wall extending horizontally over the feeding platform in such a position and size as to allow only the smaller species of birds to feed from the platform. A perch of suitable size and position is preferably attached to the front wall system under the portal to allow a bird to alight and enter the shelter. The front wall system is preferably detachably secured proximate to the front edges of the side walls such that the front wall system can be removed only upon detachment of the bottom floor. The preferred attachment means of the front wall system is a pair of adjacent vertical grooves on the inner faces of the side walls in which at least one of the front wall sections is slidably inserted from the bottom of the groove to rest on the bottom floor and not be removable when the bottom floor is in place.

DESCRIPTION OF THE PREFERRED EMBODIMENTS

Figure 1:
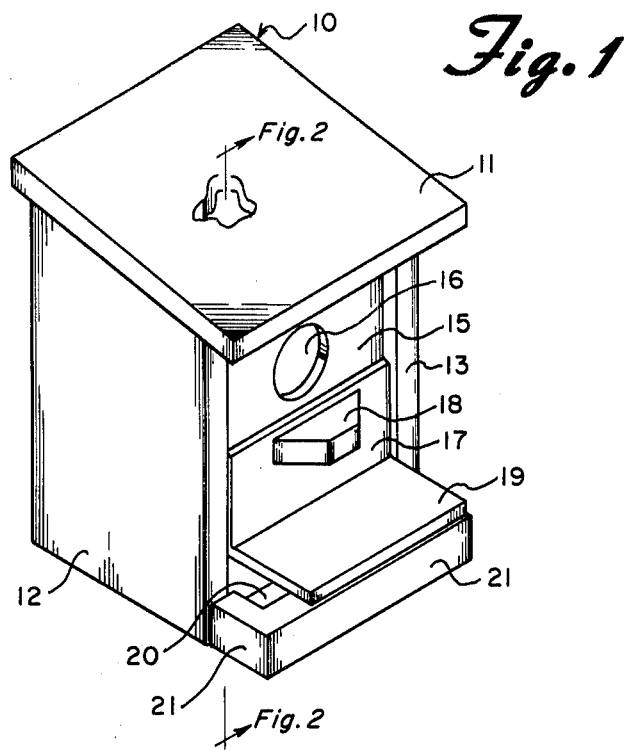
FIG. 1 is a perspective view of a bird shelter and feeder of this invention.

The combination bird shelter and feeder 10 shown in FIG. 1 is entirely constructed of redwood. While this is the preferred construction material other types of wood such as cypress, cedar, may be used. Other less desirable woods may be used as long as the surface is suitably protected from the elements. Bird house-feeder 10 may also be constructed of plastic or any other suitable material.

Figure 2:
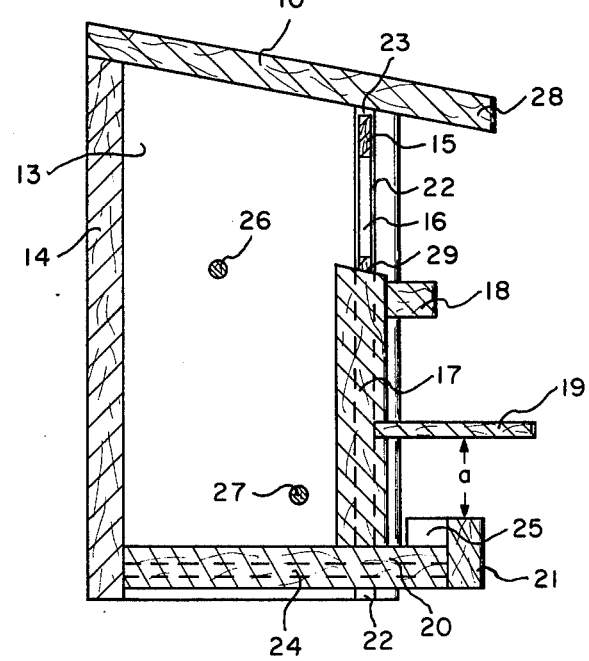
FIG. 2 is a cross-sectional view along lines 2—2 of FIG. 1.

The basic enclosure of shelter and feeder 10 has a basic housing of pitched roof, left side wall 12, right side wall 13 and back wall 14 (hidden in FIG. 1 but shown in the cross-sectional view in FIG. 2). All of these walls are constructed of three-quarter inch redwood and provide an interior space of approximately 4 inches×5 inches×8 inches. The size is determined to be suitable for many of the smaller birds including wrens, chickadees, nuthatches, titmice, bluebirds and like species. The side wall, back wall and roof are rabbeted together and glued together with a suitable wood adhesive.

The front wall of bird shelter and feeder 10 is in two sections, top section 15 through which portal 16 is provided to the interior of the shelter. In this embodiment wall section 15 is provided with a one and three-quarter inch hole suitable for bluebirds. Bottom front wall section 17 has extending therefrom perch 18 which is located directly under portal 16 to allow the birds to alight and enter shelter 10. Also extending from the front face of bottom front section 17 is feeder cover 19 which is a sheet of redwood extending entirely over the feeding section making it virtually impossible for birds larger than the space between covers 19 and the bird feeder to perch and remove food.

Bottom floor 20 extends outwardly under front wall sections 15 and 17 to form a feeding platform. Shoulder 21 extends completely around that part of bottom 20 that extends out past front wall 17, which forms the feeding platform.

The cross-sectional view of FIG. 2 taken along lines 2—2 of FIG. 1 shows the internal construction of shelter 10. Top 10, back 14, left side wall 12 and right side wall 13 all securely rabbeted together with wood adhesive. Right horizontal groove 22 in wall 13 is five sixteenth inches wide and five sixteenth inches deep allowing top front wall section 15 to easily ride in the grooves. When front wall sections 15 and 17 are resting on bottom 20 there is a slight opening 23 which allows ventilation. Bottom front section 17 is a three-quarter inch piece of redwood with one quarter inch-tongues extending to both sides to fit in groove 22 and an adjacent groove in wall 12, as will be shown in the later figures. Perch 18 on section 17 allows the bird to alight and enter through portal 16. The perch may be attached to either front wall section and is preferably attached to the lower section.

Bottom 20 is three-quarter inch redwood is attached through tongue 24 engaging a horizontal groove in right wall 13 and an adjacent tonque engaging a groove in left wall 12 all of which will be pictured in later figures. On the front and extending around the exposed section of bottom 20 is shoulder 21 forming space 25 in which feed may be placed for the birds residing in the shelter. Feeding station 25 is protected by extension 19 which is securely attached to bottom front wall section 17 and extends outwardly over shoulder 21. Extension 19 is placed at height "a" above shoulder 21, the height being chosen to prevent larger birds from resting on the shoulder and feeding under extension 19. Height "a" is chosen to exclude the larger birds and is preferably in the range of three-quarters inch to two inches in height. It is more preferred that "a" be seven-eighths inch to one and one-half inches in height. In this embodiment distance "a" is one and one-quarter inches in height which effectively prevents bluejays, grackles and blackbirds from feeding. Interior perches 26 and 27 are dowels extending from the interior of wall 13 to the interior of wall 12.

Top 10 extends outwardly over all of the walls but extends further toward the front by extension 28 to protect a bird resting on perch 18 from a predator from above. At the interface joint 29 between top front wall section 15 and bottom front wall section 17, the surfaces are angled downwardly to the outside to reduce the tendency for leakage since these panels merely abut against each other.

Figure 3:
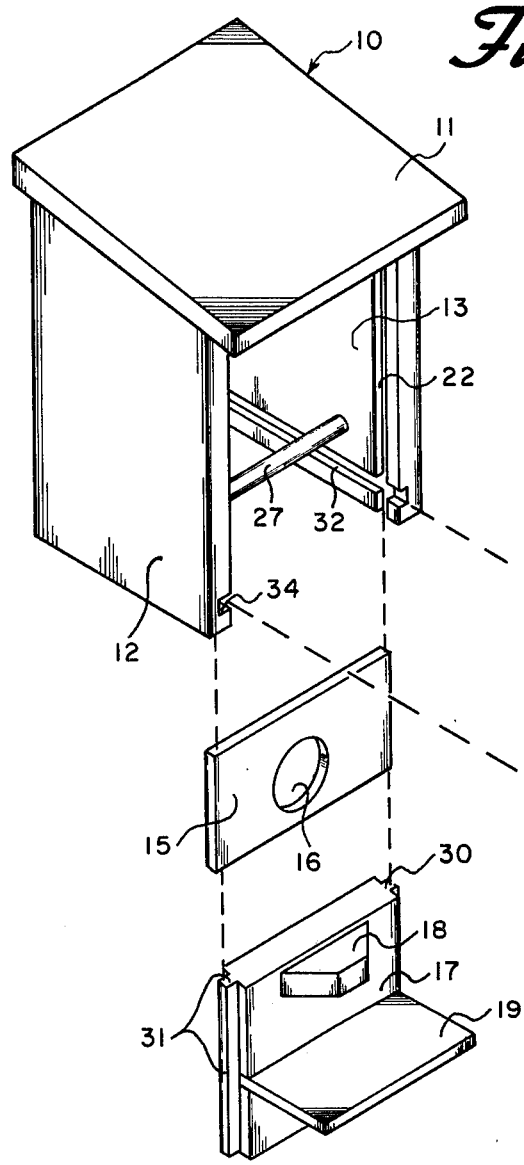
FIG. 3 is an exploded perspective view showing the detachable parts of the bird shelter and feeder described in FIG. 1.

FIG. 3 is a partially exploded perspective view of bird shelter 10 wherein all detachable parts are exploded. In this view, vertical groove 22 is shown in right wall 13. An identical groove is provided adjacent to and parallel with groove 22 on the interior face of an proximate to the front edge of left wall 12. Upper front wall section 15 is slidably inserted in these vertical grooves as is lower front wall section 17 having tongue 30 engage in groove 22 and tongue 31 engage in the identical groove on the inside face of left wall 12. In putting shelter 10 together, top front wall section 15 is inserted first, followed by bottom front wall section 17. After the front wall is in place bottom 20 is inserted under these front wall section such that right tongue 33 slides in left horizontal groove 34. When bottom 20 is fully installed, the front wall sections 15 and 17 are held securely in place until it is desired to disattach the structure. Lower interior perch 27 is shown in place, the other interior perch being hidden in this view.

Figure 4:
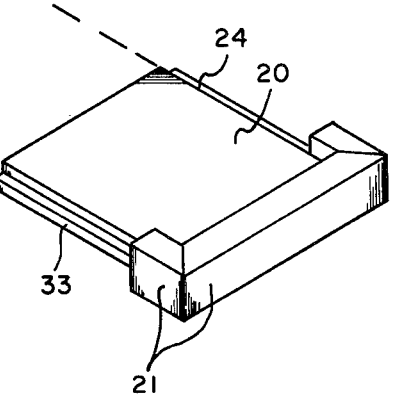
FIG. 4 is a perspective view of an alternative top front wall section with a portal designed for wrens.
Figure 4:
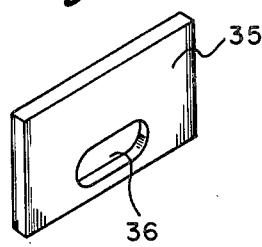
Figure 5:
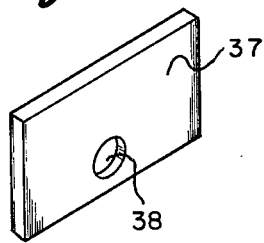
FIG. 5 is a replacement alternative top section of the front wall for smaller birds.

It is contemplated that shelter will be provided with a series of separate upper front wall sections having different size portals chosen for particular species of birds. For example, a separate replacement upper front wall section 35 is pictured in FIG. 4 with oblong portal 26 with a height of one and one-eighth inches and a length of two and one-quarter inches, that size being chosen for wrens, which like to use twigs to build their nests. Likewise, replacement front wall section 37 is pictured in FIG. 5 with one and one-quarter inches circular portal 38 which is particularly effective for chickadees, nuthatches and titmice.

While my invention is described with particularity as to material, shape and size, it should be understood that the specifics are not critical to this invention. For example, the roof may be peaked roof from side to side. In that embodiment, the top front wall section would also be peaked to provide protection from the elements. The patent is intended to include modifications and changes which may come within and extend from the following claims.

I claim:
1. A combination bird shelter and feeder comprising
   (a) an enclosure, comprising a pitched top, two upright side walls, and a back upright wall, all securably attached together,
   (b) a bottom floor detachably secured to the walls proximate to the bottom edge of the walls, the bottom floor of such size that it extends horizontally past the front edge of the side walls to form a feeding platform, (c) a shoulder means on the feeding platform to prevent feed from falling off the edges of the platform, (d) a front wall having therethrough at least one portal chosen as to size and shape to allow a predetermined size of bird to enter the shelter, and (e) a cover means attached to the front wall and extending horizontally over the feeding platform of such position and size to allow a predetermined size of bird to feed, wherein the front wall system is secured by providing a pair of adjacent vertical grooves on the inner faces of the side walls in which projections from the edges of at least one of the front wall sections are slidably inserted from the bottom of the grooves to rest upon the bottom floor when the latter is in place.

2. The bird shelter and feeder of claim 1 wherein the front wall comprises at least two separate wall sections, being at least one top front wall section and a bottom front wall section, and wherein the portal is through a top section and the cover means is attached to the bottom section.

3. The bird shelter and feeder of claim 2 wherein the front wall is detachably secured proximate to the front edges of the side walls such that the front wall can be removed upon detachment of the bottom floor.

4. The bird shelter and feeder of claim 1 wherein both sections of the front wall are slidably inserted in the grooves to rest on the bottom floor when it is in place.

5. The bird shelter and feeder of claim 2 wherein there is a plurality of interchangeable top front wall sections provided each with different size portals such that the user may choose one to attract and protect a certain type of bird.

6. The bird shelter and feeder of claim 5 wherein there is three interchangeable top front wall sections.

7. The bird shelter and feeder of claim 1 wherein the bottom floor is secured to the walls by the system of a pair of adjacent horizontal grooves on the inner face of the side walls in which projections from the edges are slidably inserted to form the floor of the shelter and the feeding platform.

8. The bird shelter and feeder of claim 1 wherein a perch is provided attached to the outside of the front wall extending under the portal of sufficient size to allow birds to alight and enter the shelter through the portal.

9. The bird shelter and feeder of claim 1 wherein the top is a flat sheet securably attached to the tops of the side and back walls and extending outwardly past the outer surface of all of the walls, being pitched toward the front of the shelter and extending past the front wall face to cover the perch.

10. The bird shelter and feeder of claim 1 wherein interior perches are provided comprising simple beams extending between the interior surface of the side walls.

11. The bird shelter and feeder of claim 1 wherein a perch is attached to the bottom front wall section.

12. A combination bird shelter and feeder comprising
(a) an enclosure, comprising a pitched top, two upright side walls, and a back upright wall, all securably attached together,
(b) a bottom floor detachably secured to the walls proximate to the bottom edge of the walls the bottom floor being such that the size that it extends horizontally past the front edge of the side walls to form a feeding platform,
(c) shoulder means on the feeding platform to prevent feed from falling off the edges of the platform,
(d) a detachable front wall system comprising at least two separate wall sections being at least one top front wall section and a bottom front wall section,
(e) the top wall section having there through at least one portal chosen as to size and shape to allow a predetermined size of bird to enter the shelter,
(f) a cover means attached to the bottom front wall section and extending horizontally over the feeding platform of such position and size to allow only a predetermined size of bird to feed,
(g) a perch attached to the outside of the front wall extending under the portal of sufficient size to allow birds to alight and enter the shelter through the portal and,
(h) attachment means to detachably secure the front wall system proximate to the front edges of the side walls that the front wall rests upon the bottom floor, wherein the front wall system is secured by providing a pair of adjacent vertical grooves on the inner faces of the side walls in which projections from the edges of at least one of the front wall sections are slidably inserted from the bottom of grooves to rest upon the bottom floor when the latter is in place.

13. The bird shelter and feeder of claim 12 wherein both sections of the front wall are slidably inserted in the grooves the lower of which rests on the bottom floor when it is in place.

14. The bird shelter and feeder of claim 12 wherein there is a plurality of interchangeable top front wall sections provided each with different size portals such that the user may choose one to attract and protect a certain type of bird.

15. The bird shelter and feeder of claim 12 wherein the bottom floor is secured to the walls by the system of a pair of adjacent horizontal groove on the inner faces of the side walls in which projections from the edges of the bottom floor are slidably inserted to form the floor of the shelter and the feeding platform.

* * * * *